Feb. 16, 1954     H. E. KNIEPKAMP     2,669,326
BRAKE

Filed Jan. 23, 1951     4 Sheets-Sheet 1

INVENTOR.
Heinrich Ernst Kniepkamp
BY
Haseltine, Lake & Co.
AGENTS.

Feb. 16, 1954 H. E. KNIEPKAMP 2,669,326
BRAKE
Filed Jan. 23, 1951 4 Sheets-Sheet 2
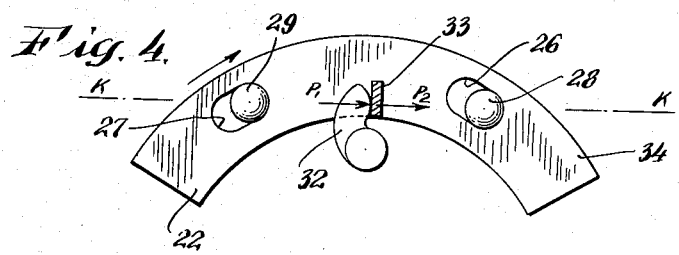
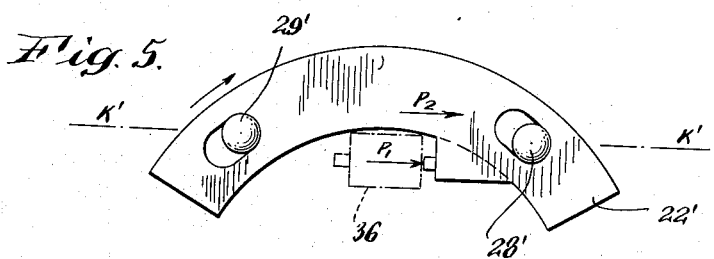
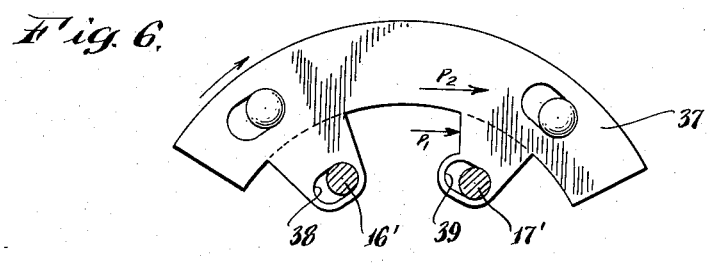
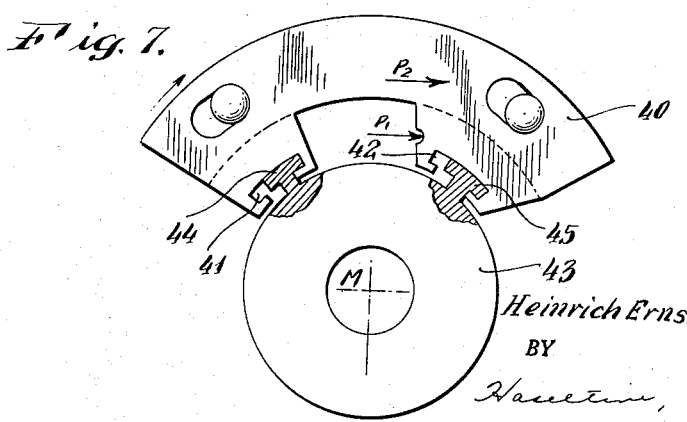
INVENTOR.
Heinrich Ernst Kniepkamp
BY
AGENTS.

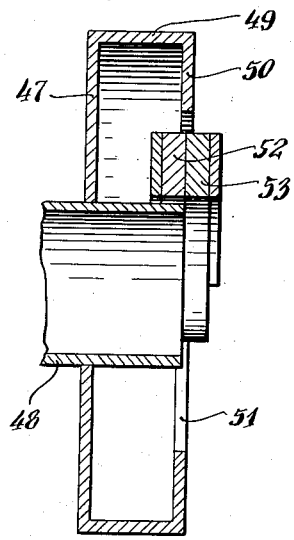
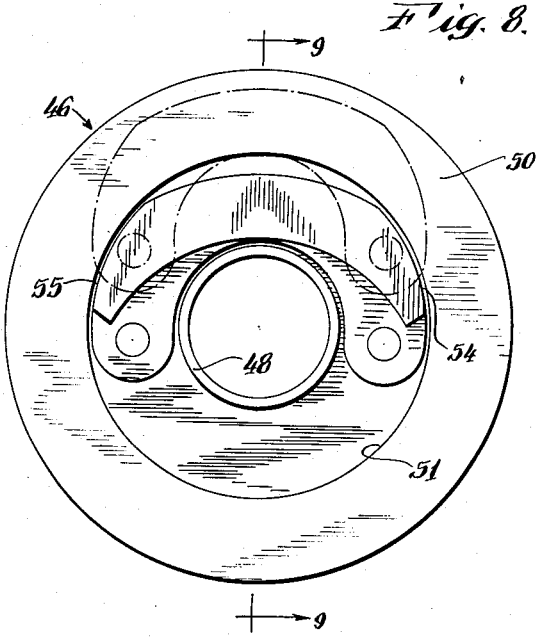
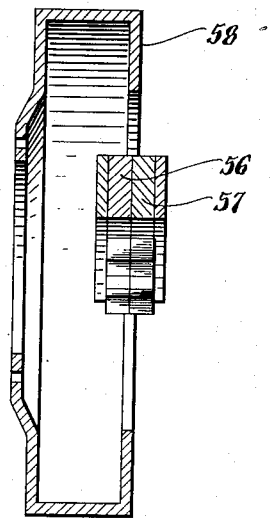
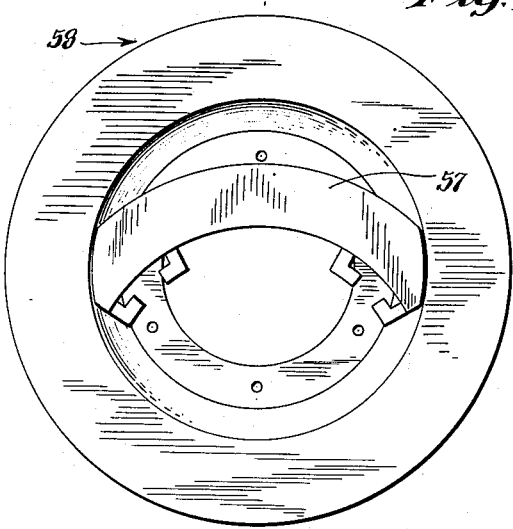

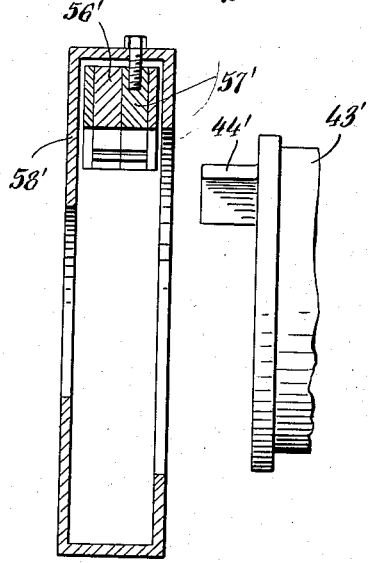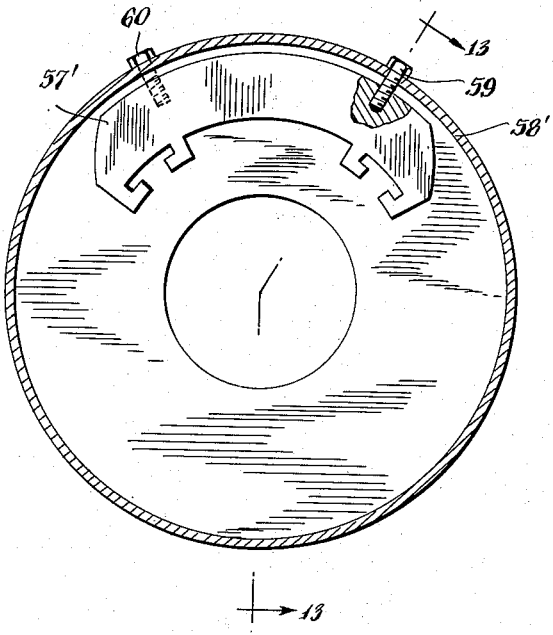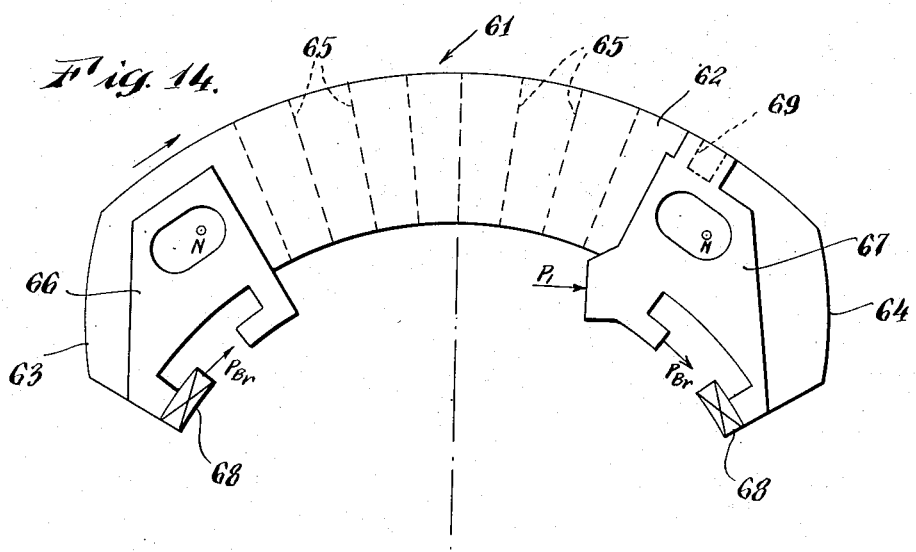

Patented Feb. 16, 1954

2,669,326

UNITED STATES PATENT OFFICE 2,669,326

BRAKE

Heinrich Ernst Kniepkamp, Heilbronn (Neckar), Germany, assignor to Hanns P. Kniepkamp, Trumansburg, N. Y.

Application January 23, 1951, Serial No. 207,321

Claims priority, application Germany September 18, 1950

12 Claims. (Cl. 188—71)

The present invention relates to brakes and more particularly to brakes for arresting the movement of rotating bodies wherein the braking elements are moved in the direction parallel to the axis of rotation for facial contact with surfaces rotating with the body to be arrested, such brakes being generally referred to as being of the "disc type."

Disc type brakes have been proposed for arresting the movement of wheels of vehicles and the like, wherein a drum is fixed to the related wheel for rotation with the latter, the drum providing two axially spaced apart, confronting, annular braking surfaces, and wherein circular, ring shaped brake shoes or lining carriers are disposed in the drum and formed with confronting inclined or sloped grooves at circumferentially spaced locations within which balls are received so that the brake shoes are moved axially apart into frictional engagement with the braking surfaces of the drum when the brake shoes are angularly displaced relative to each other in one direction. Since the brake shoes are in the form of circular rings, the grooves formed therein must not only be inclined in depth, to produce the braking action in cooperation with the balls rolling therein, but must also be arcuate in planform so that the balls will not bind in the grooves when the brake shoes are angularly displaced relative to each other. Machining such curving grooves of inclined depth in the inner faces of the brake shoes is a difficult and expensive operation, and may only be accomplished with costly and complex devices requiring expert operators. The use of circular, ring-shaped brake shoes in disc type brakes presents other difficulties or disadvantages. Since the brake shoes contact the entire braking surfaces of the brake drum there is little opportunity for the latter to discharge heat during the operation of the brakes, and consequently such braking surfaces become overly heated and contribute to the early deterioration of the brake linings. Further, brake shoes in the form of complete circular rings have been found to be excessively heavy and difficult to adjust for even contact pressure at all points of engagement with the drum.

An object of the present invention is to provide a "disc-type" brake avoiding the above mentioned difficulties and undesirable characteristics through the incorporation therein of one or more pairs of lining carriers, each shaped as a sector of a circular ring, and formed with grooves of inclined depth in the confronting faces thereof to receive balls or other rolling members so that relative angular displacement of the lining carriers in one direction effects axial movement thereof into facial contact with the braking surfaces of the associated drum.

Another object is to provide a "disc-type" brake of the described character, wherein each pair of lining carriers has only two balls or rolling members associated therewith so that the grooves of inclined depth formed in said carriers to receive the balls or rolling members may be straight and thus easily produced.

Another object is to provide a brake of the described character wherein the straight grooves formed in the confronting faces of the lining carriers are disposed tangential to the arc extending through the centers of the balls or rolling members when the latter are at rest and concentric with the ring of which the lining carriers are sectors so that the radial displacement of the lining carriers between the brake released and applied conditions is reduced to a minimum.

Another object is to provide a brake of the character indicated which is constructed so that the turning moments acting on the loose one of the lining carriers as a result of the brake applying force and as a result of the frictional contact of that one of the lining carriers with the rotating drum substantially cancel each other so that the balls or rolling bodies are not subjected to any lateral forces.

Another object is to provide a brake of the character indicated which is adapted to arrest rotation of the associated drum in either direction.

Another object of the present invention is to provide a brake of the character indicated constructed so that the brake drum presents confronting, laterally spaced braking surfaces in an integral structure to thereby avoid the difficulties heretofore experienced in attaching, maintaining and providing sufficient rigidity in drums of multiple piece construction without increasing the weight thereof.

A further object is to provide a brake of the described character constructed so that the assembling of the several parts is substantially facilitated.

A still further object is to provide a brake of the character indicated which includes lining carriers of light weight and improved heat dissipating characteristics.

Finally, it is an object of the present invention to provide a brake having the foregoing features and advantages in a simple and inexpensive manner.

The above and other objects, features and advantages will be manifest in the following detailed description of several preferred embodiments of the invention, which are, however, merely illustrative, when such description is read in connection with the accompanying drawings wherein:

Fig. 4 is a diagrammatic side view of the movable lining carrier of the brake of Figs. 1-3 and showing the lines of application of the forces acting on that carrier;

Fig. 5 is a diagrammatic side view similar to Fig. 4 but showing the dispositions of the forces utilizing another form of brake actuator;

Fig. 6 is a view similar to Fig. 5 but showing the movable lining carrier of a brake adapted to effect braking in either direction of rotation;

Fig. 7 is a view similar to Fig. 6 showing another construction adapted to effect braking in either direction of rotation;

Fig. 8 is a side elevational view illustrating the assembling of a disc-type brake constructed according to an embodiment of the present invention;

Fig. 9 is a vertical sectional view taken along the line 9—9 of Fig. 8;

Fig. 10 is a side elevational view illustrating the assembling of a disc-type brake constructed according to another embodiment of the present invention, wherein the brake drum is removable from the wheel shaft;

Fig. 11 is a vertical sectional view taken along the line 11—11 of Fig. 10;

Fig. 12 is a lateral sectional view illustrating the assembling of a disc-type brake embodying the invention;

Fig. 13 is a longitudinal sectional view taken along the line 13—13 of Fig. 12;

Fig. 14 is a side elevational view showing the details of construction of a lining carrier embodying the invention.

Figure 15:
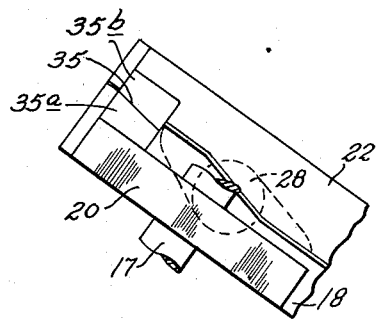
Fig. 15 is a detail view, on an enlarged scale, showing elements included in the embodiment of Figs. 1 to 3, and viewed in the direction of the arrows 15—15 on Fig. 2.

Referring to the drawing in detail, and initially to Figs. 1-4 thereof, a disc-type brake 10 embodying the present invention is there shown to include a two-piece brake drum 11 formed of a substantially circular disc secured to the rotating shaft 12 and having an axially extending marginal flange, to the edge of which an annular plate is secured. The confronting inner faces of the circular disc and annular plate provide braking surfaces 13 and 14, respectively. A fixed braking collar 15 loosely surrounds the shaft 12 and supports two axially extending bolts or pins 16 and 17 which project into the brake drum. An angularly fixed brake lining carrier 18 is formed as a sector or section of a circular ring and has lugs 19 and 20 extending inwardly at the opposite ends of the inner curved edge thereof to slidably engage on the bolts or pins 16 and 17, respectively. Thus, the lining carrier 18 is axially movable within the brake drum but is held against angular displacement by the bolts or pins 16 and 17. Brake lining 21 is secured to the outer face of the lining carrier 18 for facial engagement with the braking surface 14 of the drum.

A movable brake lining carrier 22 is also formed as a sector or section of a circular ring and carries brake lining 23 at its outer surface for facial engagement with the braking surface 13 of the drum. The carriers 18 and 22 are formed in their confronting inner faces with grooves 24 and 25 and grooves 26 and 27, respectively. These grooves have sloped or inclined bottoms (Fig. 3) so that the depth of each groove varies along its length. Balls or rolling members 28 and 29 are received in the cooperating grooves 24 and 26 and grooves 25 and 27, respectively, to roll along such grooves when the lining carriers are relatively angularly displaced for effecting axial movement of the carriers so that the brake linings are moved into and out of contact with the related braking surfaces of the drum 11. The balls 28 and 29 also serve to hold the angularly movable carrier 22 in position within the brake drum.

It will be noted that the grooves 26 and 27 of the angularly movable carrier deepen in the direction of the rotation of the brake drum and that the grooves 24 and 25 of the angularly fixed carrier are oppositely inclined so that angular displacement of the carrier 22 in the direction of rotation relative to the carrier 18 causes the balls 28 and 29 to roll from their rest positions toward the shallower portions of the related grooves to thereby axially spread apart the carriers for frictional contact between the brake linings and the braking surfaces of the drum. Frictional contact between the braking surface 13 and the lining 23 on the angularly movable carrier tends to drag that carrier along with the drum in the direction of rotation of the latter so that the carriers are further spread apart and the braking force is automatically amplified.

Spring members 30 (Fig. 1) interposed between the carriers are 18 and 22 for resiliently displacing the latter angularly in the direction for releasing the brake, and a brake applying rock shaft 31 extends axially through the fixed collar 15 into the brake drum and has a radial finger 32 on the end thereof engageable against an abutment 33 formed centrally on the angularly movable carrier 22. When the shaft 31 is rocked clockwise, as viewed in Fig. 2, the finger 32 is operative to displace the carrier 22 angularly in the direction of rotation of the brake drum for applying the brake, and when the pressure of the finger against the abutment is relaxed, the spring 30 returns the movable carrier to its original angular position for releasing the brake.

Since the lining carriers 18 and 22 are in the form of sectors or sections of a circular ring, rather than each being a complete circular ring as in the previously proposed disc-type brakes, only two points of relative contact, that is, the balls 28 and 29, may be provided, with the ball receiving grooves being straight in plan form (Fig. 2) to facilitate the machining thereof. The fact that the grooves are not concentric with the center of rotation results in some radial movement of the movable carrier 22 in response to its angular displacement in applying or releasing the brake. Such radial movement of the movable carrier, even though slight, would be intolerable in disc-type brakes having lining carriers in the form of complete circles since it would result in binding of the rolling balls in the receiving grooves. In the illustrated embodiment of this invention, the radial movement of the carrier 22 is not objectionable, and the effect of such movement is further minimized by arranging the grooves so that the centerlines 34 thereof are tangential to the arc of a circle extending through the centers of the balls 28 and 29, when the latter are in rest position, and concentric with the axis of rotation.

Figure 2:
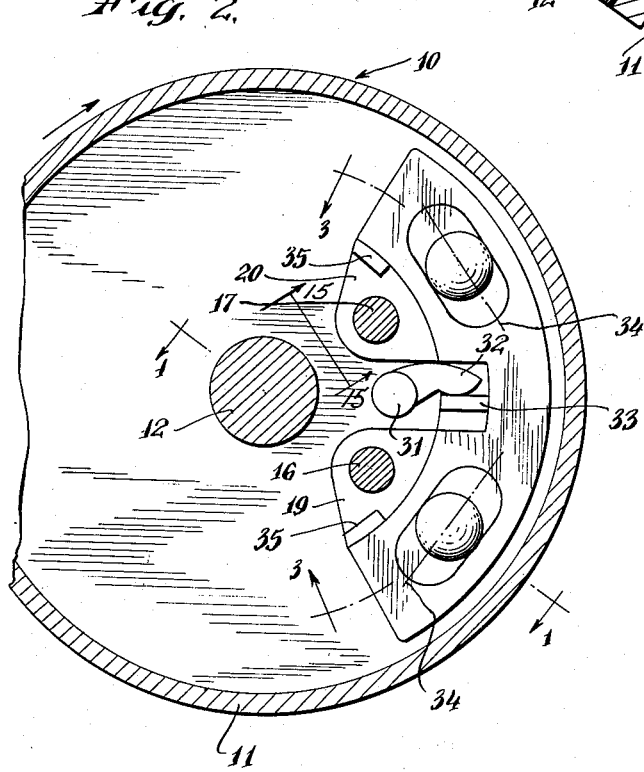
Fig. 2 is a horizontal sectional view of the same disc brake and taken along the line 2—2 of Fig. 1.
Figure 3:
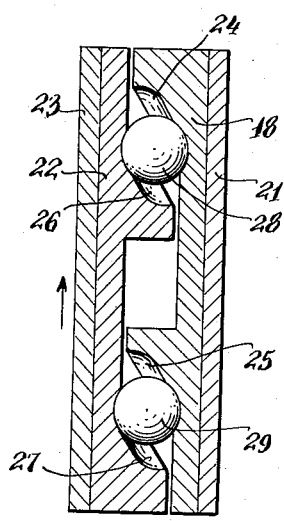
Fig. 3 is a diagrammatic sectional view developed by flattening out the view along the arc extending through the center of the balls or rolling members of the brake of Figs. 1 and 2.

Since the brake releasing springs 30 impose a tilting moment on the lining carriers about the axis passing through the centers of balls 28 and 29, confronting inclined starting surfaces 35 are formed on the lining carriers 18 and 22 (Fig. 15) at locations laterally inward relative to the axis through the centers of the balls to prevent movement together of the inner portions of the lining carriers when the brake is in released position and to maintain the carriers in substantially parallel relationship during initial movement toward the braking position. Such inclined starting surfaces 35 may be formed on the confronting surfaces of lugs 35a and 35b projecting from the end portions of the inner edges of the carriers 18 and 22, respectively (Figs. 2 and 15). The inclination of the starting surfaces 35 is less than the slope of the ball receiving grooves so that the starting surfaces come out of mutual engagement during the latter portion of the axial movement of the carriers toward braking position by reason of the distance between the carriers then being greater than the combined height of the inclined starting surfaces. Since the contact pressure between the starting surfaces is not very great, such surfaces may be in the form of sliding bearing surfaces as in the illustrated embodiment of the invention. However, if it is desired to further reduce the frictional resistance to initial angular displacement of the movable lining carrier when applying the brake, balls working in sloping grooves, similar to the main actuating balls 28 and 29 and grooves 24, 25, 26 and 27, may be substituted for the sliding bearing surfaces.

As noted above in this description, the force applied to the movable carrier 22 to effect angular displacement of the latter is automatically amplified or increased by the tendency of the brake drum to drag the movable carrier with it in the brake applying direction. Thus, the forces acting on the movable carrier in the plane of angular movement thereof consist of the force $P_1$ applied by the braking key or finger 32 against the abutment 33, and the force $P_2$ resulting from the dragging effect of the brake drum on the movable carrier and considered as being applied at the center of area of the outer face of the lining carrier engaging the braking surface 13 of the drum (Fig. 4). In order to minimize any twisting effect on the movable carrier as a result of the forces $P_1$ and $P_2$ which effect might cause the balls 28 and 29 to bind in the respective grooves or to be subjected to other than compression loads, it is preferable to arrange the locations of the grooves relative to the center of area of the lining carrying surface and relative to the point of contact of the finger or key 32 with the abutment 33 so that the turning moments of the forces $P_1$ and $P_2$ about the plane extending through the centers of the balls 28 and 29, when the latter are in rest position, stabilize or counteract each other.

As shown diagrammatically in Fig. 4, this condition of stability or equilibrium of the turning moments may be achieved in the illustrated embodiment by arranging the grooves so that the plane K—K extending through the centers of the balls in the rest position extends through the center of area of the lining carrying surface, at which point the force $P_2$ is concentrated, and by arranging the finger 32 and abutment 33 so that the point of contact therebetween, at which the force $P_1$ acts, is also disposed in the plane K—K. Thus, in the embodiment of Fig. 4 the several parts of the brake are arranged so that the forces $P_1$ and $P_2$ do not produce any turning moments about the plane K—K.

When the brake applying force $P_1$ is applied against the movable carrier by the plunger of a compressed air or fluid pressure operated cylinder, it may not be convenient to arrange the parts so that the point of application of the force $P_1$ coincides with the center of area of the lining supporting surface of the carrier. In that event, as illustrated diagrammatically in Fig. 5, the grooves receiving the balls 28' and 29' are positioned relative to the center of area of the movable carrier 22' so that the plane K'—K', extending through the centers of the balls in the rest position, is disposed between the point at which the plunger of cylinder 36 applies the force $P_1$ to the movable carrier and the center of area of the latter at which the force $P_2$ is concentrated. When arranged in the foregoing manner, the turning moments of the forces $P_1$ and $P_2$ around the plane K'—K' balance each other and the equilibrium is maintained.

In the embodiments of the invention described above, the pins 16 and 17 only engage the angularly fixed lining carrier 18 to transmit the braking moments to the fixed collar 15, and therefore the brakes constructed according to these embodiments are adapted to halt or arrest rotation of the brake drum in only one direction. In providing brakes for vehicles capable of forward and reverse movement, such as, for example, automobiles, it is necessary that the brakes be capable of arresting rotation of the associated wheels in either direction. Disc-type brakes embodying the present invention can be easily adapted for that purpose by providing two similar lining carriers constructed in the manner illustrated diagrammatically in Fig. 6. In the lining carrier 37 of Fig. 6, the body in the form of a sector or section of a circular ring is provided with radial lugs extending from the inward curved edge thereof and formed with elongated slots 38 and 39 through which the fixed pins or bolts 16' and 17' loosely extend. When the two similar lining carriers 37 are assembled in a brake, the pins or bolts 16' and 17' extend through both of the carriers to transmit the braking moments for rotation of the brake drum in either direction. The slots 38 and 39 in each of the carriers are positioned relative to the ball receiving grooves thereof so that, when rotation of the drum in one direction is to be arrested, one of the carriers is free to be angularly displaced in the direction of rotation while the other carrier is held against angular movement in the direction of rotation by the engagement of the holding pins against the trailing ends of the slots thereof, and so that, when rotation of the drum in the opposite direction is to be arrested, said one of the carriers is held against angular displacement in that opposite direction by engagement of the holding pins against the trailing ends of the slots thereof while said other carrier is free to be displaced in that opposite direction of rotation. Thus, one or the other of the lining carriers can be angularly displaced in the direction of rotation to effect braking of the drum rotating in either direction.

In place of the pins and elongated slots of the construction illustrated in Fig. 6, the connection between the fixed collar and the lining carriers in a brake adapted to arrest rotation of the drum in either direction may assume the form of the device shown in Fig. 7. In the construction of Fig. 7, each of the similar lining carriers 40 is formed with radial lugs extending from the inner curved edge of the body of the carrier and having inwardly opening T-shaped slots 41 and 42 formed therein. The fixed collar 43 is formed with circumferentially spaced apart radial projections 44 and 45 having T-shaped cross-sections to fit loosely into the T-shaped slots 41 and 42, respectively, so that the carriers are free to be angularly displaced a limited distance in opposite directions.

The lining carriers of the embodiments of the invention heretofore described have each been formed as a sector or section, preferably enclosing an angle of substantially 120°, of a circular ring so that the brake linings mounted on the carriers engage only one-third of the braking surfaces of the brake drum. Thus, two-thirds of the braking surfaces are exposed to permit dissipation of heat therefrom. While the illustrated embodiments each include only one set of paired lining carriers, it is to be understood that two or three such sets may be provided, constructed and operating in the same manner, with the additional sets of lining carriers increasing the braking moments but also decreasing the exposed areas of the braking surfaces of the drum to decrease the possibilities for heat dissipation. Further, the use of sector shaped lining carriers permits a desirable reduction in the weight thereof when compared with the weight of lining carriers of complete circular ring form.

Figure 1:
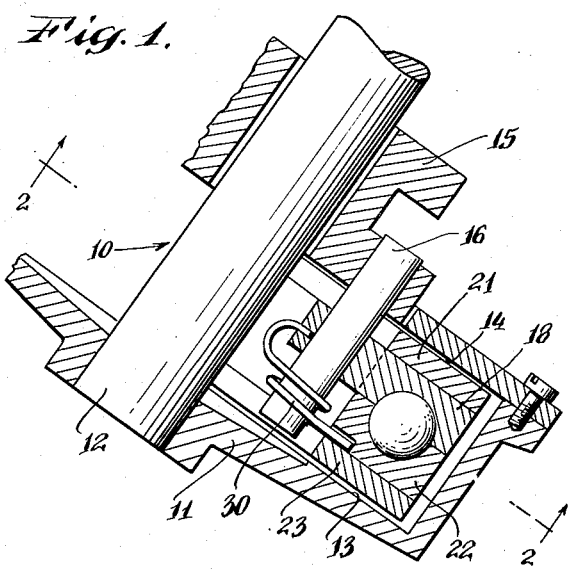
Fig. 1 is a vertical sectional view of a disc brake constructed according to an embodiment of this invention and taken along the line 1—1 of Fig. 2.

The use of lining carriers formed as sectors or sections of circular rings, rather than as complete circular rings, has the further advantage of permitting the formation of the brake drum as a unitary or integral member. That is, as seen in Fig. 1, conventional brake drums include a circular disc forming the surface 13 and provided with a marginal, axially extending flange to which the annular plate forming the other braking surface 14 is removably attached so that the usual circular ring-like lining carriers may be inserted in the drum when the annular plate is removed. When the lining carriers are formed as sectors or sections of circular rings in accordance with this invention, the circular disc, axial marginal flange and annular plate of the brake drum may all be formed as a unitary or integral structure, as illustrated in Figs. 8–13, and the carriers may be installed in the drum through the central opening in the annular plate portion of the drum.

Referring to Figs. 8 and 9, an integral brake drum 46 is there shown to include a circular disc portion 47 which is fixed on a wheel shaft 48 and has an axially extending marginal flange 49 formed integral with the disc portion and with the axially spaced annular plate portion 50. The annular plate portion 50 defines a central circular opening 51 through which the lining carrier assemblies 52 and 53 may be introduced axially for installation within the brake drum 46. In order to adapt the lining carriers for insertion through the opening 51, the planform of the carrier, such as is shown in Fig. 2, must be modified by cutting the outer corners thereof along the arcuate lines 54 and 55 (Fig. 8). Such reduction of the area of the lining on the carrier does produce a slight reduction in the braking moments that may be obtained, however, the increase in the rigidity of the brake drum and the reduction in the costs and time required for the assembly and maintenance resulting from the integral construction of the brake drum appear to outweigh this one disadvantage. After the lining carrier assemblies have been introduced axially into the brake drum 46, the carriers are displaced radially to the broken line position of Fig. 8 to receive the holding pins or bolts in the lugs of the angularly fixed carrier.

In the event that the integrally formed brake drum is detachable from the wheel shaft, as in Figs. 10 and 11, the lining carriers 56 and 57, which are of the type described in connection with Fig. 7, may be adapted for insertion into the brake drum 58 by the removal of less of the outer corners than was necessary with the arrangement of Figs. 8 and 9. Since the wheel shaft does not obstruct the center of the circular opening of the brake drum, the lining carriers may be inserted at the widest part of such opening and, thus, the overall dimensions of the carriers may be larger. After the carriers 56 and 57 have been introduced into the brake drum, the carriers are moved radially outward to operative positions. As shown in Fig. 7, the carriers of the construction illustrated there and in Figs. 10 and 11 are restrained in their angular displacement by projections 44 and 45 of T-shaped cross-sections extending from the angularly fixed collar 43 and engaging in the T-shaped slots of the carriers.

In order to assist in the insertion of such projections in the slots of the carriers, the carriers may be formed with outwardly opening, radial, tapped bores to removably receive bolts extending through the axial flange of the drum, as in Figs. 12 and 13. With this arrangement, the bolts 59 and 60 support the carriers 56' and 57' in operative, radially outward, position so that the collar 43' may be advanced axially into the drum 58' to engage the projections on the collar in the related T-shaped slots of the carriers. Once this engagement is effected, the bolts 59 and 60 may be withdrawn, and the collar structure then maintains the carriers in the operative positions thereof.

Referring now to Fig. 14, a preferred construction for a lining carrier of the general type illustrated in Figs. 7, 10, 11, 12 and 13 is there shown. The carrier 61 of Fig. 14 includes a body 62 formed of light metal and shaped as a sector or section of a circular ring with the outer corners being cut off along the arcuate lines 63 and 64. The body 62 may be formed with radial open passages 65 to accelerate the removal of heat from the lining carrier. Since the forces N applied against the lining carrier by the balls received in the grooves, the force $P_1$ moving the movable carrier angularly and the forces $P_{br}$ transmitting the braking moments from the carrier to the nonrotatable collar holding the angularly fixed carrier are all concentrated within relatively limited areas, such areas may be formed by steel castings or forgings 66 and 67 of sufficient strength to withstand the localized stresses of high magnitude. The body 62, of light metal, and the steel forgings or castings 66 and 67 are preferably joined together in a manner to provide efficient transmission of stresses therebetween. This may be accomplished by forming the steel forgings or castings 66 and 67 with projections or lugs extending from the edges thereof and casting the body 62 of light metal directly around such projections so that a molecular connection is obtained between the several parts. The body 62 may also be joined to the castings or forgings 66 and 67 by the well known "alfin" process, which will also provide a molecular connection at the meeting surfaces for efficiently transmitting the stresses. The castings or forgings 66 and 67 each include a groove to receive the related ball, a T-shaped slot for receiving the projection on the holding collar and an inclined starting surface 68. The casting or forging 67 also includes a tapped bore 69 to receive the assembling bolt and a ledge at one side to receive the actuating force $P_1$. Thus, the lining carriers are preferably of composite construction to combine the characteristics of light weight, improved dissipation of heat and requisite strength in the required regions.

While the invention resides in the combinations, arrangements of parts and details of construction appearing in the embodiments heretofore specifically described, the present invention is not limited to those precise embodiments as obviously changes and modifications may be effected therein by one skilled in the art without departing from the spirit or scope of the invention which it is intended to define in the appended claims.

What is claimed is:

1. A disc-type brake comprising a brake drum providing axially spaced, annular braking surfaces, at least one group of two angularly displaceable brake lining carriers disposed in said drum and carrying brake lining at the outer surfaces thereof for facial contact with said braking surfaces of the drum, the confronting inner faces of said carriers being formed with sloped grooves which are straight in planform and deepen in opposite directions, and rolling bodies received in said grooves to spread said carriers apart when the latter are relatively angularly displaced in the direction for moving said rolling bodies toward the shallow portions of the related grooves, each of said carriers being substantially in the form of less than one-half of a circular ring so that the carriers of each group can move radially relative to each other when said rolling bodies are moved along the related straight grooves by relative angular displacement of said carriers to prevent binding of said rolling bodies in said grooves.

2. A disc-type brake according to claim 1 including fixed means for restricting angular displacement of the one of said group of carriers having the sloped grooves thereof deepening in the direction opposed to the rotation of said drum, and means engageable with the other of said group of carriers and operative to angularly displace said other carrier in the direction of rotation of said drum to thereby effect axial movement of said carriers toward said braking surfaces.

3. A disc-type brake according to claim 2, including spring means engaging said group of carriers for resiliently effecting relative angular displacement thereof in the direction for axially moving said carriers away from said braking surfaces.

4. A disc-type brake according to claim 3, including cooperative means on each of said carriers holding the carriers of a group axially apart at points interposed radially between said grooves and the points of engagement of said spring means with said carriers during initial axial movement of said carriers toward said braking surfaces.

5. A disc-type brake according to claim 4, wherein said cooperative means includes bearing surfaces on the inside of each carrier inclined relative to the plane of relative angular displacement thereof and engageable with complementary inclined bearing surfaces on the other of said carriers, the combined height of the engageable bearing surfaces being substantially less than the axial distance between said carriers when the latter contact said braking surfaces so that the engageable bearing surfaces are operative only during the initial axial movement of the carriers toward said braking surfaces.

6. A disc-type brake according to claim 4, wherein said cooperative means includes sloped grooves formed in the confronting inner faces of said carriers and disposed radially inward relative to the first mentioned grooves, the last mentioned grooves being less sloped than the first mentioned grooves, and rolling bodies received in the last mentioned grooves operative to hold said carriers apart during initial movement of the latter toward said braking surfaces and being inactive when said carriers contact the related braking surfaces.

7. A disc-type brake according to claim 1, wherein two of said grooves are formed in each of said carriers and disposed tangential to the circular arc concentric with the axis of rotation of said brake drum and extending through the centers of said rolling bodies, when the latter are positioned at rest in the deepest portions of the receiving grooves, so that initial movement of said rolling bodies from the rest position thereof is tangential to said circular arc.

8. A disc-type brake comprising a brake drum defining axially spaced, annular braking surfaces, at least one group of two relatively angularly displaceable brake lining carriers disposed in said drum and carrying brake lining at the outer faces thereof for facial contact with said braking surfaces, two sloped grooves formed in the inner face of each of said carriers, the sloped grooves of one carrier and being straight in planform cooperating with and deepening in the opposite direction from the sloped grooves of the other carrier, two rolling bodies received in the cooperating grooves to spread said carriers apart when the latter are relatively angularly displaced in the direction for moving said rolling bodies toward the shallow portions of the related grooves, fixed means for restricting the angular displacement of the one of said carriers having the sloped grooves thereof deepening in the direction opposed to the rotation of said drum, and means engageable with the other of said carriers and operative to angularly displace said other carrier in the direction of rotation of said drum for axially moving said carriers apart into contact with said braking surfaces, said grooves and the point of engagement of said means with said other carrier being located so that said point of engagement and the center of the area of said other carrier contacting the adjacent braking surface are related to the plane extending through the centers of the rolling bodies, when the latter are disposed in the rest position in the deepest portions of the receiving grooves to effect balancing of the turning moments of the force applied by said means and of the frictional force applied by said adjacent braking surface about said plane, each of said carriers being substantially in the form of less than one-half of a circular ring so that the carriers of each group can move radially relative to each other to prevent binding of said rolling bodies in said straight grooves when said carriers are displaced angularly relative to each other.

9. A disc-type brake according to claim 8, wherein said grooves are disposed in the related carriers and the point of engagement of said means with said other carrier is located so that said center of area and said point of engagement coincide with said plane extending through the centers of said rolling bodies in the rest position.

10. A disc-type brake comprising a brake drum defining axially spaced, annular braking surfaces, at least one group of two relatively angularly displaceable brake lining carriers disposed in said drum and carrying brake lining at the outer faces thereof for facial contact with said braking surfaces, cooperating sloped grooves formed in the confronting inner faces of said carriers, said grooves being straight in planform and deeping in opposite directions, rolling bodies received in said grooves to spread said carriers apart when the latter are relatively angularly displaced to move said rolling bodies toward the shallow portions of the related grooves, fixed supporting means extending into said drum, and means mounting one of said carriers of each group on said supporting means for axial movement relative to the drum and for limited angular displacement, said mounting means being related to the positions of said grooves so that, when the carriers are both angularly displaced in either direction to the limit of such displacement, said rolling bodies are moved onto the shallow portions of said related grooves, each of said carriers being substantially in the form of less than one-half of a circular ring so that the other carrier of each group can move radially relative to said one carrier of the related group to prevent binding of said rolling bodies in said straight grooves when said carriers are displaced angularly relative to each other.

11. A disc-type brake according to claim 10, including resilient means angularly displacing said carriers in opposite directions, and wherein said mounting means are related to the positions of said grooves so that said rolling bodies are disposed in rest positions at the deepest portions of the related grooves, when said carriers are angularly displaced to the limits of such displacement in opposite directions by said resilient means.

12. A disc-type brake according to claim 11, including brake applying means selectively operative to angularly displace, in the direction of rotation of said drum, the one of said carriers having grooves deepening in the direction of said rotation.

HEINRICH ERNST KNIEPKAMP.

References Cited in the file of this patent

UNITED STATES PATENTS

| Number | Name | Date |
|---|---|---|
| 1,947,839 | Fissell | Feb. 20, 1934 |
| 1,994,689 | Cooper | Mar. 19, 1935 |
| 2,105,867 | Stewart | Jan. 18, 1938 |
| 2,526,149 | Myers et al. | Oct. 17, 1950 |
| 2,607,445 | Rausenberger | Aug. 19, 1952 |